July 27, 1926. 1,593,833
J. M. LYONS
GUIDE ARM FOR TANK VALVES
Filed Feb. 23, 1926
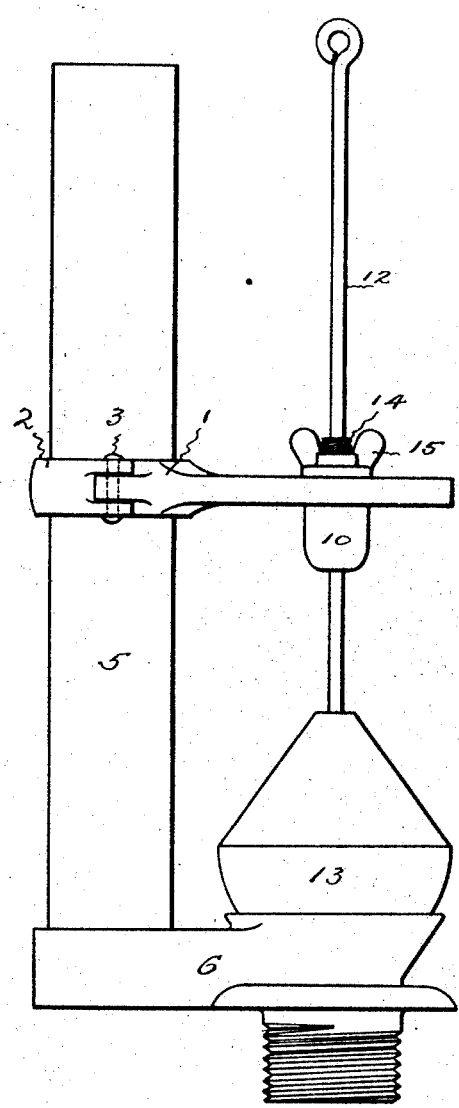
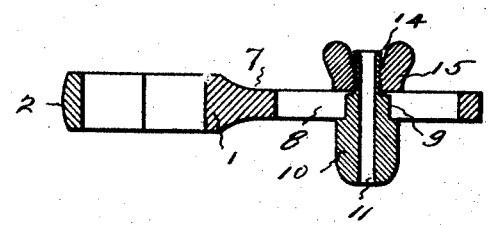
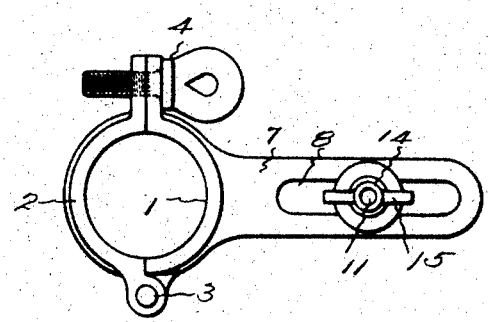
INVENTOR
John M. Lyons
Harry P. Williams
Atty.

Patented July 27, 1926.

1,593,833

UNITED STATES PATENT OFFICE.

JOHN M. LYONS, OF NEW YORK, N. Y., ASSIGNOR TO GOOD MANUFACTURING CO., OF NEW YORK, N. Y., A CORPORATION OF NEW YORK.

GUIDE ARM FOR TANK VALVES.

Application filed February 23, 1926. Serial No. 89,887.

This invention relates to the construction of those plumbers' fittings which are clamped upon the overflow pipes of flush tanks, and are provided for guiding the rods that are attached to the float valves which are employed to open and close the outflow openings from the flush tanks to closet bowls.

It is essential that rods of such valves move up and down freely and that they be so guided that the valves will surely seat themselves tightly on the top of the outflow fittings in order to prevent leakage.

The object of the present invention is to provide a simple and cheap arm of this character which is so constructed that it may be readily clamped at any desired height upon an overflow pipe and turned so as to project radially therefrom over the center of the outflow fitting, which arm carries a thimble that has a perforation for receiving and suitably guiding the valve rod and which is movable lengthwise of the arm in order that it may be so adjusted that the valve stem perforation will be in exact line with the center of the outflow fitting regardless of the distance of the fitting from the overflow pipe, thus ensuring the exact register of the valve with its seat when it closes.

In the accompanying drawings Fig. 1 shows an elevation of a flush-tank outlet-fitting and float valve, with an arm constructed according to this invention supported by the overflow pipe and adjusted to properly guide the rod of a float valve. Fig. 2 shows a longitudinal section of the arm. Fig. 3 is a plan view of the arm.

In the embodiment illustrated the arm has a yoke-shaped section 1 with a semi-circular opening and a yoke-shaped section 2 with a semi-circular opening. On one side these sections have lugs that are hinged together by a pin 3, and on the other side they have lugs that are drawn together by a thumb screw 4. The circular opening formed by these sections is designed to fit the overflow pipe 5 that extends upward from the outlet fitting 6. When the thumb screw is loosened the arm may be raised and lowered on, and turned so as to project in any desired radial direction from the overflow pipe and when the thumb screw is tightened the arm is securely clamped on the overflow pipe in the exact required position to properly guide the valve rod.

In the projecting portion 7 of the arm is a slot 8 and fitting in this slot so as to be capable of movement along the arm in and out toward the clamping sections is the stem 9 of the thimble 10 which has a central vertical perforation 11 for receiving and guiding the rod 12 of the float valve 13. The thimble stem while movable along the slot is desirably shaped so that it will not rotate therein, and its upper end 14 which extends above the arm is threaded and screwed upon this threaded end above the arm is a wing nut 15. When this nut is loosened the guiding thimble may be adjusted along the arm and when the nut is tightened the thimble is secured in place.

This simple and cheap construction permits the arm to be readily clamped at any desired height on the overflow pipe and to be turned so as to project radially therefrom in the necessary direction, and it also allows the thimble to be quickly adjusted in and out so that the perforation will receive and guide the rod in such manner that the valve will easily open from and accurately seat itself upon the outflow fitting.

The invention claimed is:—

1. A guide arm for float valve rods which comprises a section adapted to be clamped upon an overflow pipe, an arm projecting from the clamping section, said arm having a vertical slot, a thimble having a perforation for receiving and guiding a valve rod, said thimble extending through and movable along said slot longitudinally of the arm, and a nut adapted to be screwed upon the thimble for securing the thimble to the arm in the position to which it is adjusted.

2. A guide arm for float valve rods which comprises a section adapted to be clamped upon an overflow pipe, an arm projecting radially from the clamping section, said arm having a longitudinal slot, a thimble having a perforation for receiving and guiding a valve rod said thimble extending through and movable along said slot longitudinally of the arm, and a nut adapted to be screwed upon the thimble for securing the thimble to the arm in the position to which it is adjusted.

3. A guide arm for float valve rods which comprises an openable clamp, an arm integral with and projecting from one section of the clamp, said arm having a longitudinal slot, a thimble movable along said slot and having a perforation for receiving and guiding a valve rod, and a wing nut adapted to be screwed upon the thimble for securing the thimble to the arm in the position to which it is adjusted.

4. A guide arm for float valve rods which comprises a hinged clamping section, an arm projecting radially from the clamping section, said arm having a longitudinal slot, a thimble having a vertical guiding perforation for receiving a valve rod, said thimble having a stem extending through said slot and movable along but not rotatable therein, and a nut adapted to be screwed upon the thimble stem for securing the thimble to the arm.

JOHN M. LYONS.